(12) United States Patent
Dunne et al.

(10) Patent No.: US 8,713,537 B2
(45) Date of Patent: Apr. 29, 2014

(54) MONITORING HEAP IN REAL-TIME BY A MOBILE AGENT TO ASSESS PERFORMANCE OF VIRTUAL MACHINE

(75) Inventors: Jonathan Dunne, Abbeyside (IE); Jeffrey B. Sloyer, Fisherville, VA (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 13/100,994

(22) Filed: May 4, 2011

(65) Prior Publication Data

US 2012/0284313 A1 Nov. 8, 2012

(51) Int. Cl.
*G06F 9/44* (2006.01)

(52) U.S. Cl.
USPC .......................................................... 717/127

(58) Field of Classification Search
USPC .......................................................... 717/127
See application file for complete search history.

(56) References Cited

U.S. PATENT DOCUMENTS

| | | | |
|---|---|---|---|
| 7,082,604 B2 * | 7/2006 | Schneiderman | 718/100 |
| 7,882,160 B2 | 2/2011 | Adams, III et al. | |
| 2003/0167421 A1 * | 9/2003 | Klemm | 714/37 |
| 2004/0158589 A1 * | 8/2004 | Liang et al. | 707/206 |
| 2005/0228880 A1 * | 10/2005 | Champlin | 709/224 |
| 2006/0048017 A1 * | 3/2006 | Anerousis et al. | 714/47 |
| 2006/0195823 A1 | 8/2006 | Bentolila | |
| 2010/0114997 A1 | 5/2010 | Micic et al. | |
| 2010/0161687 A1 | 6/2010 | Altrichter et al. | |
| 2010/0205230 A1 | 8/2010 | Simeonov et al. | |
| 2010/0229156 A1 | 9/2010 | Fink et al. | |

OTHER PUBLICATIONS

Office Action for U.S. Appl. No. 13/410,079 dated Jul. 1, 2013.

* cited by examiner

*Primary Examiner* — Philip Wang
(74) *Attorney, Agent, or Firm* — Robert A. Voigt, Jr.; Winstead, P.C.

(57) ABSTRACT

A system and computer program product for monitoring a heap in real-time to assess the performance of a virtual machine. A mobile agent is created to be preloaded with boundary settings for each heap metric. Boundary settings are thresholds that are used to diagnose the effectiveness of operation of the heap. The mobile agent is deployed onto an application server to monitor the effectiveness of operation of the heap of a virtual machine within the application server. If a boundary setting for one of the heap metrics is exceeded, then the mobile agent determines whether a non-critical, a critical or a fatal error has occurred. An appropriate response is then performed. By monitoring the heap in real-time, undesirable behavior characteristics of the heap can be detected early thereby allowing remedial actions to be enacted to address such problems before those problems escalate into more serious problems.

14 Claims, 3 Drawing Sheets

MONITORING HEAP IN REAL-TIME BY A MOBILE AGENT TO ASSESS PERFORMANCE OF VIRTUAL MACHINE

TECHNICAL FIELD

The present invention relates to virtual machines, such as Java® Virtual Machines (JVMs), and more particularly to monitoring a heap in real-time by a mobile agent, such as an aglet, to assess the performance of a virtual machine, such as a JVM.

BACKGROUND

Java® is a programming language designed to generate applications that can run on all hardware platforms without modification. Java® was modeled after C++, and Java® programs can be called from within hypertext markup language (HTML) documents or launched stand alone. The source code of a Java® program is compiled into an intermediate language called "bytecode," which cannot run by itself The bytecode is converted (interpreted) into machine code at runtime. When running a Java® application, a Java® interpreter (Java® Virtual Machine (JVM)), is invoked. The JVM translates the bytecode into machine code and runs it. As a result, Java® programs are not dependent on any specific hardware and will run in any computer with the JVM software.

A heap is a memory area, which contains all of the objects created by an application running on the JVM. During the course of executions, some objects may no longer be needed or used by an application. These types of objects are considered old objects. As more objects are created, the amount of space in the heap decreases. At some point in time, it is appropriate or useful to clear out or free objects that are no longer being used by an application. This process is referred to as garbage collection. In other words, the old objects are no longer needed by the program and can be removed. This process involves memory recycling. When an object is old, the space in the heap occupied by this object may be recycled such that the space is made available for subsequent new objects. An object is considered old when the object is no longer referenced by a program or application. A program or application has a reference to an object, which allows the program or application to manipulate the object. A reference is similar to a pointer.

JVMs may be used in various systems, such as an enterprise information system. In such a system, it is important to ensure that the JVMs are operating correctly as undesirable behavior, as discussed below, by the JVMs could have an adverse affect on the enterprise applications or the system itself.

Such undesirable behavior includes out of memory issues and heap fragmentation. For example, the JVM locates a contiguous free space within the heap to allocate an object; if the JVM cannot locate a contiguous free space of sufficient size, then an Out of Memory error is returned to the application running on the JVM. This problem of locating contiguous free space of sufficient size in the heap increases as the size of allocation requests increases. In particular, as the JVM allocates and then deallocates objects within the heap, the free space in the heap becomes fragmented over time, leading to the return of Out of Memory errors when the total free space in the heap is large enough for an object allocation, because there is no contiguous free space large enough for a particular object allocation. For example, because of fragmentation, a heap may include 100 MB total of free space, however, the largest contiguous free space is only 1 MB, leading to the return of an Out of Memory error when the JVM attempts to allocate an object greater than 1 MB.

Another undesirable behavior of the JVM includes excessive garbage collection. As discussed above, garbage collection is a form of automatic memory management. In garbage collection, a garbage collector attempts to reclaim garbage, or memory occupied by objects that are no longer in use by the program. By implementing an excessive amount of garbage collection, the garbage collector may be running too frequently thereby inefficiently using the processor which could be using those cycles for other tasks.

Another undesirable behavior of the JVM includes memory leaks. A memory leak occurs when a program consumes memory but is unable to release it back to the operating system. If too many memory leaks occur, these memory leaks can usurp all of memory and bring everything to a halt or slow the processing considerably. For instance, the JVM allocates and deallocates memory automatically. However, program level leaks can still occur. For example, programming errors can lead to object references still being held in a global data structure, which leads to reduced free space on the heap for allocating new objects.

Furthermore, an undesirable behavior of the JVM may involve the number of objects queued for finalization. Finalization is a feature of the Java® programming language that allows one to perform postmortem cleanup on objects that the garbage collector has found to be unreachable. It is typically used to reclaim native resources associated with an object via a finalize method. If a class has a finalize method, then objects of that type do not have their space reclaimed at garbage collection time. Instead, after garbage collection, the objects are queued for finalization, which occurs sometime later. In the JVM implementation, "finalizers" are executed by a daemon thread that services the finalization queue. If the finalizer thread cannot keep up with the finalization queue, it is possible that the heap will fill up and an Out of Memory error will be issued.

In addition, an undesirable behavior of the JVM may involve an excessive number of compactions. Compaction, performed during garbage collection, refers to moving objects in the heap so that the objects the garbage collector is supposed to reclaim and all remaining objects become contiguous in the heap. That is, compaction optimizes the heap by defragmenting the heap in such a manner that all the live objects are rearranged to have larger contiguous free spaces within the heap. However, by having an excessive number of compactions, the processor is being used inefficiently.

Currently, there are no real-time monitoring tools to monitor such undesirable behavior by the JVMs in real-time. Such behavior, without correcting it, may lead to servers crashing, applications becoming damaged, applications becoming unreliable or unavailable and even manifest itself into a system-wide issue. Since there are no real-time monitoring tools to monitor such behavior, by the time these problems are detected, it may be too late to take remedial action.

BRIEF SUMMARY

In one embodiment of the present invention, a computer program product embodied in a computer readable storage medium for monitoring a heap in real-time to assess performance of a virtual machine comprises the programming instructions for creating a mobile agent that is preloaded with a boundary setting for each heap metric. The computer program product further comprises the programming instructions for deploying the mobile agent on an application server running a virtual machine to monitor a heap of the virtual machine. In addition, the computer program product comprises the programming instructions for identifying a non-critical error, a critical error or a fatal error in response to a metric of the heap exceeding the boundary setting.

Another form of the embodiment of the computer program product described above is in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for monitoring a heap in real-time to assess the performance of a virtual machine. In one embodiment of the present invention, a mobile agent (e.g., aglet) is created to be preloaded with boundary settings for each heap metric (e.g., a rate of growth of the heap, a rate of decline of the heap, a size of the heap, a number of garbage collections over a period of time, a number of objects queued for finalization, an upper size limit of an allocation and a number of compactions in the heap over a period of time). Boundary settings are thresholds that are used to diagnose the effectiveness of operation of the heap. The mobile agent is deployed onto an application server to monitor the effectiveness of operation of the heap of a virtual machine within the application server. If a boundary setting for one of the heap metrics is exceeded, then the mobile agent determines whether a non-critical, a critical or a fatal error has occurred. An appropriate response is then performed. By monitoring the heap in real-time, undesirable behavior characteristics of the heap can be detected early thereby allowing remedial actions to be enacted to address such problems before those problems escalate into more serious problems.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
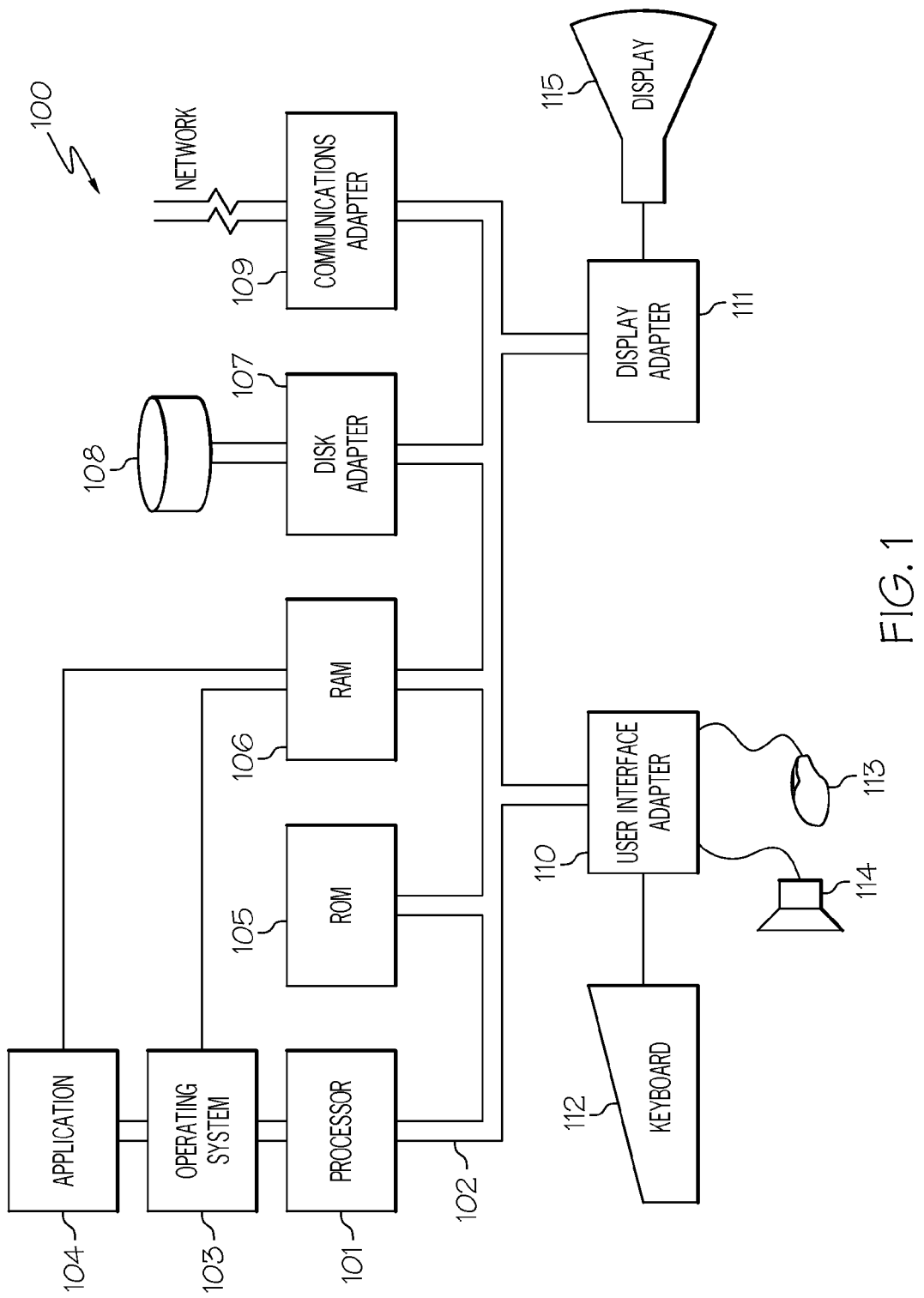
FIG. 1 is a hardware configuration of a data processing system in accordance with an embodiment of the present invention.

Referring now to the Figures in detail, FIG. 1 illustrates a hardware configuration of a computer system 100 which is representative of a hardware environment for practicing the present invention. Referring to FIG. 1, computer system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, an application for creating a mobile agent, such as an aglet, which includes the functionality of monitoring a heap in real-time to assess the performance of a virtual machine, such as a JVM, as discussed further below in association with FIGS. 2-3.

Referring again to FIG. 1, read-only memory ("ROM") 105 is coupled to system bus 102 and includes a basic input/output system ("BIOS") that controls certain basic functions of computer device 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for creating a mobile agent, such as an aglet, which includes the functionality of monitoring a heap in real-time to assess the performance of a virtual machine, such as a JVM, as discussed further below in association with FIGS. 2-3, may reside in disk unit 108 or in application 104.

Computer system 100 may further include a communications adapter 109 coupled to bus 102. Communications adapter 109 may interconnect interconnects bus 102 with an outside network thereby enabling computer system 100 to communicate with other similar devices.

I/O devices may also be connected to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, virtual machines, such as Java® virtual machines (JVMs), may be used in various systems, such as an enterprise information system. In such a system, it is important to ensure that the JVMs are operating correctly as undesirable behavior by the JVMs could have an adverse affect on the enterprise applications or the system itself. Currently, there are no real-time monitoring tools to monitor such undesirable behavior by the JVMs in real-time. Such behavior, without correcting it, may lead to servers crashing, applications becoming damaged, applications becoming unreliable or unavailable and even manifest itself into a system-wide issue. Since there are no real-time monitoring tools to monitor such behavior, by the time these problems are detected, it may be too late to take remedial action.

Figure 2:
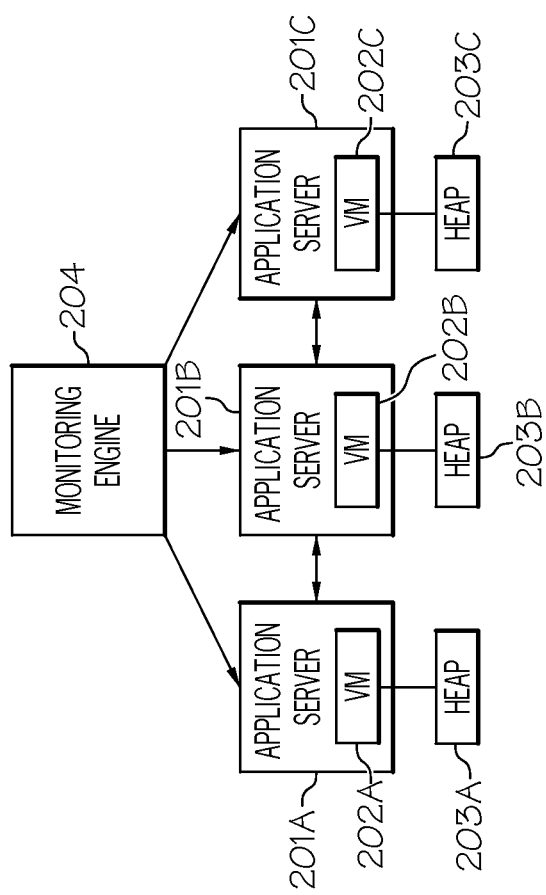
FIG. 2 illustrates the software components used in monitoring a heap in real-time to assess the performance of a virtual machine in accordance with an embodiment of the present invention.
Figure 3:
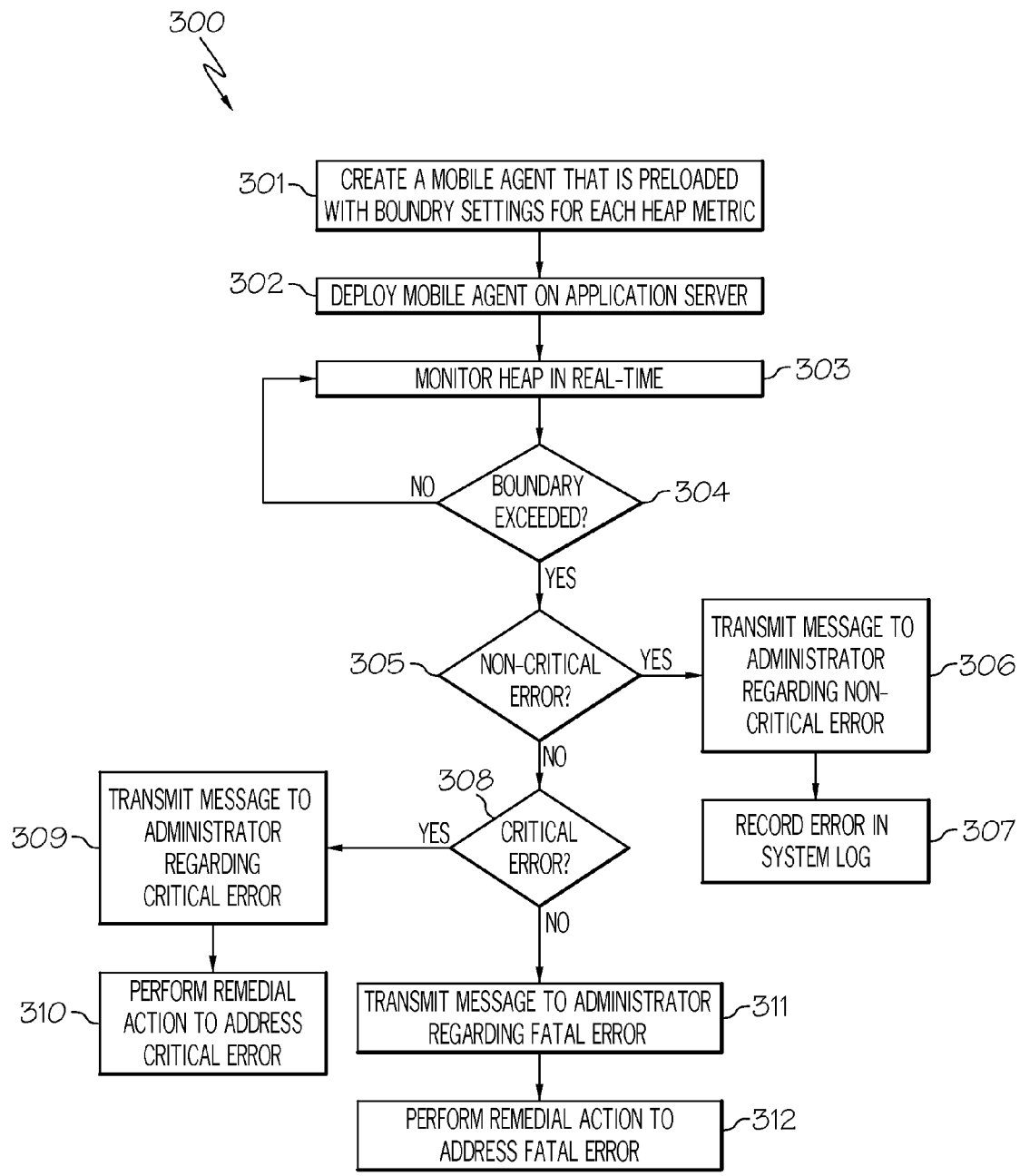
FIG. 3 is a flowchart of a method for monitoring a heap in real-time to assess the performance of a virtual machine in accordance with an embodiment of the present invention

The principles of the present invention provide a means for monitoring a heap in real-time to assess the performance of a virtual machine, such as a virtual machine, thereby providing an early warning system so as to take remedial action when necessary as discussed below in connection with FIGS. 2-3. FIG. 2 is a diagram of the software components used in monitoring a heap in real-time to assess the performance of a virtual machine. FIG. 3 is a flowchart of a method for monitoring a heap in real-time to assess the performance of a virtual machine.

Referring to FIG. 2, as stated above, FIG. 2 is a diagram of the software components used in monitoring a heap in real-time to assess the performance of a virtual machine in accordance with an embodiment of the present invention. In one embodiment, these software components may reside in application 104 (FIG. 1).

The software components include one or more application servers 201A-201C. Application servers 201A-201C may collectively or individually be referred to as application servers 201 or application server 201, respectively. In one embodiment, application server 201 is a software framework dedicated to the efficient execution of procedures for supporting the construction of applications. In one embodiment, each application server 201A-201C includes a virtual machine 202A-202C, respectively, such as a Java® virtual machine. Virtual machines 202A-202C may collectively or individually be referred to as virtual machines 202 or virtual machine 202, respectively.

In one embodiment, each virtual machine 202A-C may use a heap 203A-203C, respectively, which is an area within memory 106 (FIG. 1), which contains all of the objects created by an application running on virtual machine 202. Heaps 203A-C may collectively or individually be referred to as heaps 203 or heap 203, respectively.

While FIG. 2 illustrates a particular number of application servers 201, virtual machines 202 and heaps 203, the principles of the present invention are not to be limited in scope to any particular number of application servers 201, virtual machines 202 and heaps 203.

Additionally, the software components include a monitoring engine 204 configured to create a mobile agent (e.g., aglet) used to monitor heap 203 for identifying behavior that exceeds various boundary settings of heap metrics (e.g., rate of growth of the heap, rate of decline of the heap, size of the heap, number of garbage collections over a period of time, number of objects queued for finalization, upper size limit of allocations, number of compactions in the heap over a period of time, etc.) in real-time in an attempt to take remedial action prior to such behavior manifesting itself into serious issues as discussed below in connection with FIG. 3.

In one embodiment, the mobile agent refers to a composition of computer software and data which is able to migrate (move) from one application server 201 to another autonomously. As illustrated in FIG. 2, the mobile agent can be deployed from monitoring engine 204 onto any of the application severs 201 (indicated by arrows from monitoring engine 204 and application server 201). Further, as illustrated in FIG. 2, the mobile agent can migrate from one application server 201 to another (indicated by arrows between application servers 201).

While FIG. 2 illustrates the various software components residing on a single computer platform, the principles of the present invention are not to be limited in scope to such an architecture but may be applied to having these software components residing on different computer platforms. For example, each application server 201 may reside on a separate computer platform where monitoring engine 204 resides on a separate computer platform. A person of ordinary skill in the art would be capable of applying the principles of the present invention to such implementations. Further, embodiments applying the principles of the present invention to such implementations would fall within the scope of the present invention.

As stated above, FIG. 3 is a flowchart of a method 300 for monitoring a heap in real-time to assess the performance of a virtual machine in accordance with an embodiment of the present invention.

Referring to FIG. 3, in conjunction with FIGS. 1-2, in step 301, monitoring engine 204 creates a mobile agent (e.g., an aglet) that is preloaded with boundary settings for each heap metric. Boundary settings are thresholds that are used to diagnose the effectiveness of operation of heap 203 of virtual machine 202. For example, boundary settings may include a threshold for a metric that relates to the rate of growth of heap 203, the rate of decline of heap 203, the size of heap 203 (e.g., upper size limit of 300 MB, upper size limit of 150 MB after garbage collection), the number of garbage collections over a period of time (e.g., 2.5 seconds between global collections), the number of objects queued for finalization, an upper size limit of an allocation, a number of compactions in heap 203 over a period of time and so forth. The principles of the present invention are not limited to such examples but instead include all metrics that may be used to diagnose the effectiveness of operation of heap 203/virtual machine 202.

In step 302, monitoring engine 204 deploys the mobile agent onto application server 201 to monitor the effectiveness of operation of heap 203 of virtual machine 202. As discussed above, the mobile agent is configured to migrate or move from one application server 201 to another running a virtual machine process. Upon the mobile agent being deployed onto application server 201 or migrating to another application server 201, the mobile agent monitors heap 203 as discussed below in the following steps, steps 303-312. By having the mobile agent monitor heap 203 in real-time, undesirable behavior characteristics of heap 203 can be detected early thereby allowing remedial actions to take place to address such problems before those problems escalate into more serious problems.

In step 303, the mobile agent monitors heap 203 in real-time. As discussed above, the mobile agent may be monitoring heap 203 based on various operational metrics (e.g., the rate of growth of the heap, the rate of decline of the heap, the size of the heap, the number of garbage collections over a period of time, the number of objects queued for finalization, an upper size limit of an allocation, a number of compactions in the heap over a period of time).

In step 304, the mobile agent determines if a boundary setting has been exceeded. For example, one of the metrics used in monitoring heap 203 may be an upper size limit after garbage collection. The mobile agent then determines if that upper size limit has been exceeded.

If the mobile agent does not detect any boundary settings that have been exceeded, then the mobile agent continues to monitor heap 203 in real-time in step 303.

If, however, the mobile agent detects a boundary setting has been exceeded, then, in step 305, the mobile agent determines if a non-critical error has occurred. A non-critical error refers to errors that do not necessarily have a negative impact on the applications running on virtual machine 202 or in the system but is informative as to how heap 203 is performing. For example, virtual machine 202 may have allocated a large allocation in heap 203 to create an object. Such a large allocation may have exceeded a boundary setting (e.g., upper limit of allocation size), but it is not necessary resulting in a negative performance impact on applications running on virtual machine 202 or in the system. If such events continue though, it may have performance ramifications.

If a non-critical error has occurred, then, in step 306, the mobile agent transmits a message, such as to an administrator, informing the recipient regarding the non-critical error. Such a message may be color-coded (e.g., color-coded green) indicating the severity level, such as indicating that a non-critical error has been detected.

In step 307, the mobile agent records the non-critical error in a system log.

If, however, a non-critical error has not occurred, then, in step 308, the mobile agent determines whether a critical error has occurred. A critical error refers to errors that do have a negative impact on the applications running on virtual machine 202 or in the system but is not fatal in causing the system to cease operating.

If a critical error has occurred, then in step 309, the mobile agent transmits a message, such as to an administrator, informing the recipient regarding the critical error. Such a message may be color-coded (e.g., color-coded orange) indicating the severity level, such as indicating that a critical error has been detected.

In step 310, the mobile agent performs a remedial action to address the critical error. For example, the load on the virtual machine may be reduced to address the critical error caused by a high rate of growth of the heap and a high rate of compactions occurring in the heap.

If, however, a critical error has not occurred, then a fatal error has occurred. A fatal error refers to errors that will lead to computer failures, including system-wide crashes, if no remedial action is taken in time. When a fatal error occurs, in step 311, the mobile agent transmits a message, such as to an administrator, informing the recipient regarding the fatal error. Such a message may be color-coded (e.g., color-coded red) indicating the severity level, such as indicating that a fatal error has been detected.

In step 312, the mobile agent performs a remedial action to address the fatal error. For example, the processes on virtual machine 202 are stopped to avoid a server/system-wide crash.

While the foregoing discusses using a single boundary setting in determining if an error has occurred, the principles of the present invention cover such implementations that use multiple boundary settings in determining if an error has occurred, and if so, what type of error (e.g., non-critical, critical, fatal).

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A computer program product embodied in a computer readable storage medium for monitoring a heap in real-time to assess performance of a virtual machine, the computer program product comprising the programming instructions for:
   creating a mobile agent that is preloaded with a boundary setting for each heap metric;
   deploying said mobile agent onto an application server running a virtual machine to monitor a heap of said virtual machine, wherein said mobile agent moves from said application server to a second application server running a second virtual machine; and
   identifying one of a non-critical error, a critical error and a fatal error in response to a metric of said heap exceeding said boundary setting.

2. The computer program product as recited in claim 1, wherein said heap metric comprises one or more of the following: a rate of growth of said heap, a rate of decline of said heap, a size of said heap, a number of garbage collections over a period of time, a number of objects queued for finalization, an upper size limit of an allocation and a number of compactions in said heap over a period of time.

3. The computer program product as recited in claim 1 further comprising the programming instructions for:
   recording said non-critical error in a system log in response to identifying said non-critical error.

4. The computer program product as recited in claim 1 further comprising the programming instructions for:
   performing a remedial action to address one of said critical error and said fatal error in response to identifying one of said critical error and said fatal error, respectively.

5. The computer program product as recited in claim 1 further comprising the programming instructions for:
   terminating a process running on said virtual machine in response to identifying said fatal error.

6. The computer program product as recited in claim 1 further comprising the programming instructions for:
   transmitting a color-coded message that corresponds to identifying one of said non-critical error, said critical error and said fatal error.

7. The computer program product as recited in claim 1, wherein said mobile agent is an aglet.

8. A system, comprising:
   a memory unit for storing a computer program for monitoring a heap in real-time to assess performance of a virtual machine; and
   a processor coupled to said memory unit, wherein said processor, responsive to said computer program, comprises
   circuitry for creating a mobile agent that is preloaded with a boundary setting for each heap metric;
   circuitry for deploying said mobile agent onto an application server running a virtual machine to monitor a heap of said virtual machine, wherein said mobile agent moves from said application server to a second application server running a second virtual machine; and
   circuitry for identifying one of a non-critical error, a critical error and a fatal error in response to a metric of said heap exceeding said boundary setting.

9. The system as recited in claim 8, wherein said heap metric comprises one or more of the following: a rate of growth of said heap, a rate of decline of said heap, a size of said heap, a number of garbage collections over a period of time, a number of objects queued for finalization, an upper size limit of an allocation and a number of compactions in said heap over a period of time.

10. The system as recited in claim 8, wherein said processor further comprises:
    circuitry for recording said non-critical error in a system log in response to identifying said non-critical error.

11. The system as recited in claim 8, wherein said processor further comprises:
    circuitry for performing a remedial action to address one of said critical error and said fatal error in response to identifying one of said critical error and said fatal error, respectively.

12. The system as recited in claim 8, wherein said processor further comprises:
    circuitry for terminating a process running on said virtual machine in response to identifying said fatal error.

13. The system as recited in claim 8, wherein said processor further comprises:
    circuitry for transmitting a color-coded message that corresponds to identifying one of said non-critical error, said critical error and said fatal error.

14. The system as recited in claim 8, wherein said mobile agent is an aglet.

* * * * *